United States Patent [19]
Ueno et al.

[11] Patent Number: 5,833,373
[45] Date of Patent: Nov. 10, 1998

[54] BEARING RETAINER AND METHOD OF FABRICATING THE SAME

[75] Inventors: Hiroshi Ueno, Tondabayashi; Kazuhisa Kajihara, Yao; Akihiro Bun, Toyoaki; Hideki Fujiwara, Kasiwara, all of Japan

[73] Assignee: Koyo Seiko Co., Ltd., Osaka, Japan

[21] Appl. No.: 840,764

[22] Filed: Apr. 16, 1997

[30] Foreign Application Priority Data

Apr. 16, 1996 [JP] Japan ..................................... 8-094458
Jun. 13, 1996 [JP] Japan ..................................... 8-175753

[51] Int. Cl.⁶ .................................................. F16C 33/56
[52] U.S. Cl. ........................................... 384/527; 384/625
[58] Field of Search ..................................... 384/527, 528, 384/531, 523, 573, 625

[56] References Cited

U.S. PATENT DOCUMENTS 5,571,341  11/1996  Jackel .
5,630,668   5/1997  Ikezawa et al. ..................... 384/527

FOREIGN PATENT DOCUMENTS 0408168  1/1991  European Pat. Off. .
0511409  11/1992 European Pat. Off. .
0515701  12/1992 European Pat. Off. .
0516899  12/1992 European Pat. Off. .
19500576  9/1995  Germany .
06049623  2/1994  Japan .
07054123  2/1995  Japan .

*Primary Examiner*—Lenard A. Footland
*Attorney, Agent, or Firm*—Reid & Priest LLP

[57] ABSTRACT

A bearing retainer having a body formed of steel has a nitride layer on the body surface. The average particle diameter of a nitride contained in the nitride layer is not more than 1 μm. The surface of the retainer is subjected to fluoriding treatment, and is then subjected to nitriding treatment. The above-mentioned oxide is removed by replacing an oxide on the surface of the retainer with a metal fluoride film by the fluoriding treatment. In the nitriding treatment, a gaseous mixture of gas for nitriding, for example, ammonia gas and hydrogen gas for removing the metal fluoride film is brought into contact with the surface of the retainer. A precise and uniform nitride layer is obtained in a state where the oxide is reliably removed from the surface of the retainer.

4 Claims, 8 Drawing Sheets

F I G. 1
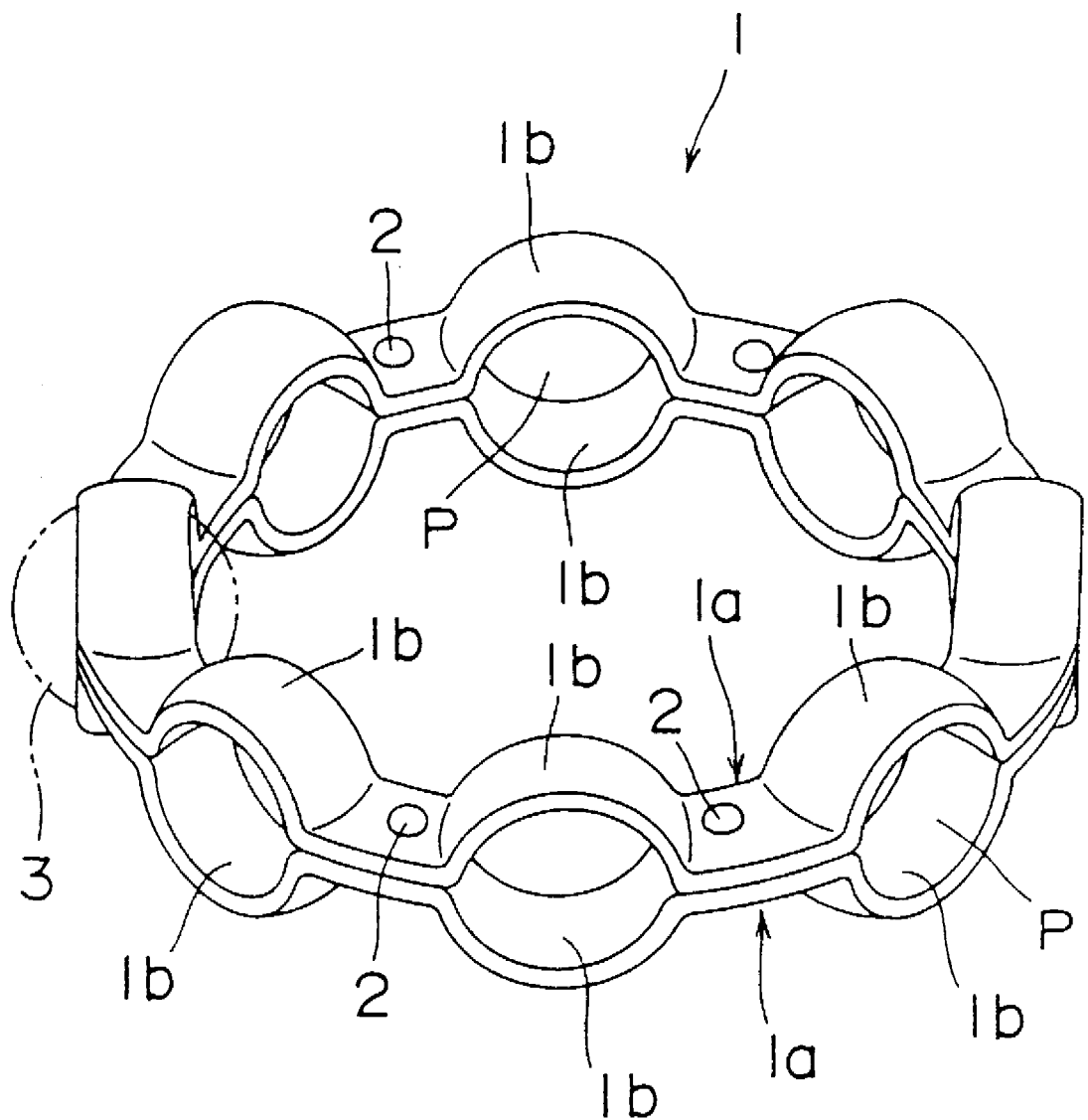

F I G. 3
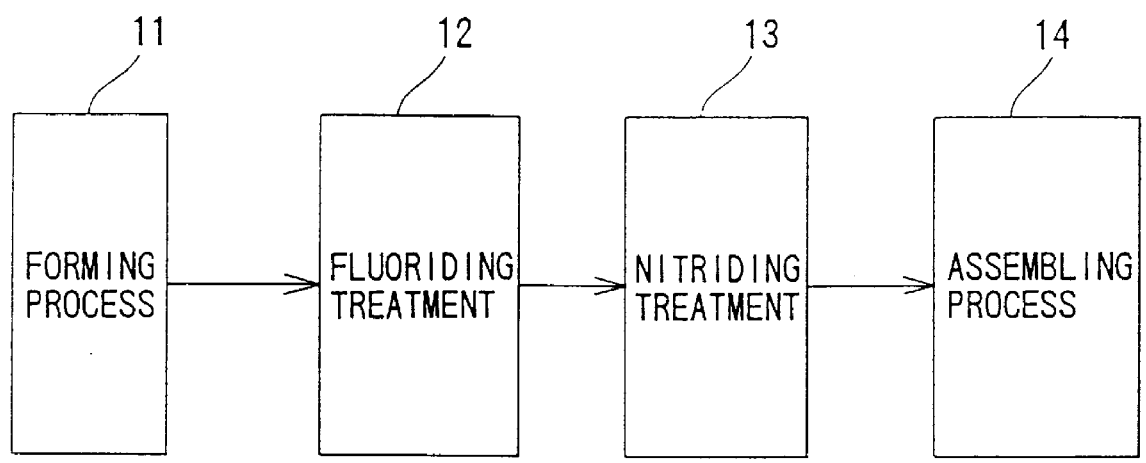

BEARING RETAINER AND METHOD OF FABRICATING THE SAME

CROSS REFERENCE TO RELATED APPLICATION

This application claims priority benefits under 35 USC §119 of Japanese Patent Application Serial No. 8-94458 and Japanese Patent Application Serial No. 8-175753, the disclosure of which is incorporated by reference.

BACKGROUND OF THE INVENTION

1. Field of the Invention

The present invention relates to a bearing retainer made of steel and a method of fabricating the same.

2. Description of Related Arts

In a bearing retainer made of steel, problems of improving the strength thereof and preventing friction have been conventionally presented. For example, in a deep groove ball bearing for receiving a crankshaft with an engine for a two-wheeled vehicle and particularly a two-cycle engine, a retainer pressed in a corrugated shape (so-called a corrugated press retainer) has been used. The corrugated press retainer has been subjected to surface treatment in order to solve the above-mentioned problems. Examples of the surface treatment include nitriding treatment such as salt bath nitriding called Tufftride treatment or gas nitriding. When the corrugated press retainer is subjected to the nitriding treatment, the lubricity thereof can be improved.

Since the crank bearing with a two-cycle engine is lubricated with lubricating oil mixed with gasoline, a fixed amount of lubricating oil is not always supplied. Even if the lubricity of the retainer is increased by the nitriding treatment as described above, therefore, an oil film on the surface of the retainer may be cut. A portion between the retainer and a rolling element may, in some cases, be seized.

The following are considered as the cause of the above-mentioned cutting of the oil film. As a pretreatment of the nitriding treatment, an oxide on the surface is generally removed. Since the shape of the corrugated press retainer is complicated, however, the oxide is difficult to remove. Moreover, an adsorbing action of oxygen to the surface and an oxidizing action are also exerted again after the removal. Eventually, the oxide on the surface cannot be completely removed.

When the surface is subjected to the nitriding treatment in a state where the oxide remain thereon, the thickness of a nitride layer formed by the nitriding treatment becomes insufficient in a portion where the oxide remains. As a result, the thickness of the nitride layer becomes non-uniform, and a lot of cracks are formed thereon.

On the surface of the above-mentioned nitride layer, the smoothness is not sufficient. Moreover, the above-mentioned cracks exist. Therefore, the lubricating oil is not easily held on the uppermost surface of the nitride layer. Consequently, it is considered that the oil film is easily cut, resulting in insufficient lubrication.

SUMMARY OF THE INVENTION

An object of the present invention is to provide a bearing retainer having a uniform nitride layer formed on its surface so that an oil film on the surface is not easily cut, resulting in sufficient lubrication, and a method of stably fabricating the bearing retainer.

In order to attain the above-mentioned object, in one mode of the present invention, a bearing retainer comprises a body formed of steel and a nitride layer provided on a part of a surface of the body. The nitride layer contains nitride particles, wherein the nitride particles have an average diameter of 1 $\mu$m or less.

According to the above-mentioned mode, the nitride layer formed on at least a part of the surface of the bearing retainer body is precise and uniform. In the retainer having the nitride layer formed thereon, an oil film on the surface of the nitride layer is not cut, so that good lubricity can be maintained. The nitride layer may be formed on the whole surface of the bearing retainer body.

In another mode, the present invention provides the above-mentioned fabricating method. In this mode, there is provided a method of fabricating a bearing retainer which comprises a body formed of steel and a nitride layer provided on a part of a surface of the body. The nitride layer contains nitride particles with an average diameter of 1 $\mu$m or less. The method of fabricating a bearing retainer comprises steps of subjecting the surface of the retainer to a fluoriding treatment for replacing an oxide on the surface of the retainer with a metal fluoride film, and of subjecting the surface of the retainer which has been subjected to the fluoriding treatment to nitriding treatment.

In this mode, a foreign material such as a processing aid adhering on the surface of the steel which is a base material is removed upon being destroyed, for example, by activated fluorine atoms used for the fluoriding treatment, whereby a passive state film such as an oxide film on the surface of the steel is replaced with a metal fluoride film at the same time that the surface is purified. The surface of the steel is coated with and protected by the metal fluoride film by such replacement. Therefore, an oxide is prevented from being formed until the later nitriding treatment, whereby the oxide can be reliably removed. Consequently, a nitride layer which is precise, uniform and sufficiently thick can be formed on the surface of the retainer. An oil film is not cut on the surface of the retainer having the above-mentioned nitride layer formed thereon, whereby maintaining good lubricity.

In a temperature range of 480° C. to 700° C., for example, in the case of the nitriding treatment, metallic elements such as chromium (Cr), manganese (Mn), silicon (Si), and aluminum (Al) in a steel material are conventionally easy to be oxidized. Consequently, a nitride layer cannot be stably formed on the surface of the steel material. The reason for this is that in the above-mentioned temperature range, it is difficult to create an atmosphere in which the metallic elements are completely kept neutral or reductive, whereby the metallic elements are almost oxidized in the above-mentioned temperature range. Consequently, a grain boundary oxide is formed on the surface of the steel material in the case of the nitriding treatment. The grain boundary oxide prevents the nitriding treatment. As a result, a nitride layer cannot be stably formed on the surface of the steel material.

On the other hand, in the present invention, the oxide can be reliably removed, whereby a constant nitride layer can be stably formed. Specifically, in the case of the nitriding treatment, a gaseous mixture of gas having a nitrogen source (for example, $NH_3$ gas) and hydrogen gas ($H_2$ gas) is introduced into a furnace at temperatures of approximately 480° C. to 700° C., so that the metal fluoride film coating and protecting the surface of the steel material is removed upon being destroyed by the above-mentioned $H_2$ gas. Consequently, a metal base purified and activated appears. Nitrogen atoms (N atoms) in nitrogen gas (for example, ammonia gas, i.e., $NH_3$ gas) are exerted on the activated metal base, and quickly penetrate and diffuse into the metal base, to uniformly form a deep nitride layer.

Specifically, a hard compound layer (a nitride layer) containing a nitride such as chromium nitride (for example, CrN) or iron nitride (for example, $Fe_2N$, $Fe_3N$, $Fe_4N$) is formed uniformly and deep inward from the surface of the steel, and a hard diffused layer of nitrogen atoms (N atoms) is formed subsequently thereto. The compound layer and the diffused layer constitute the entire nitride layer. Further, the hardness of the nitride layer is the same as that of a conventional Tufftride treated product, and a Vickers hardness of 450 Hv (a test load of 50 gf) is maintained as the surface hardness.

As gas containing fluorine used in the fluoriding treatment in the present invention, gas containing in inert gas such as nitrogen gas ($N_2$ gas) a fluorine source component composed of one or a mixture of nitrogen fluoride (e.g., $NF_3$), boron fluoride ($BF_3$), carbon fluoride (e.g., $CF_4$), hydrogen fluoride (HF), sulfur fluoride (e.g., $SF_6$), fluorine gas ($F_2$) is used. $NF_3$ is the most superior and practical in terms of safety, reactivity, controllability, handling properties, and the like. In such gas containing fluorine, the concentration of the fluorine source component such as $NF_3$ is set to 0.05% by weight to 20% by weight in terms of the effect. Preferably, it is in the range of 3% by weight to 5% by weight.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing a bearing retainer according to the present invention;

FIG. 3 is a block diagram showing the schematic steps of a method of fabricating the bearing retainer according to the present invention;

DETAILED DESCRIPTION OF THE PREFERRED EMBODIMENT

A bearing retainer according to one embodiment of the present invention and a method of fabricating the same will be described in detail while referring to drawings.

Figure 2:
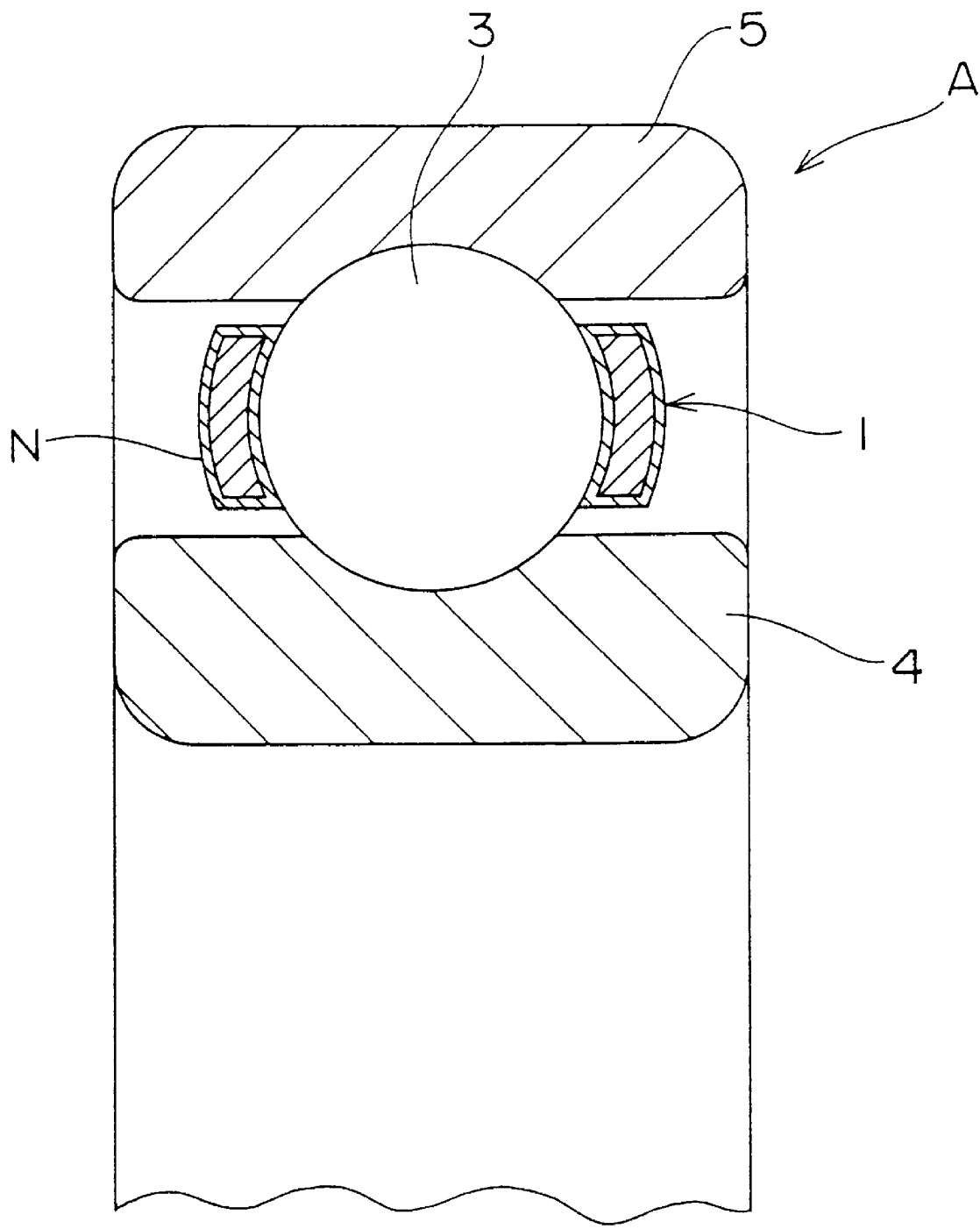
FIG. 2 is a cross-sectional view showing a bearing comprising the bearing retainer shown in FIG. 1.

Referring to FIGS. 1 and 2, a retainer 1 comprises a pair of annular plates 1a, as a main body, obtained by pressing a low-carbon steel plate such as an SPCC material, and rivets 2 for fixing the annular plates 1a to each other. The annular plates 1a are arranged opposite to each other to constitute the approximately annular retainer 1. Each of the annular plates 1a is provided with a plurality of recesses 1b equally spaced in the circumferential direction, and a rivet hole (not shown) for fixing the rivet is formed between the recesses 1b adjacent to each other in the circumferential direction. Further, the respective recesses 1b in the annular plates 1a are arranged opposite to each other, to form a pocket P containing a spherical rolling element 3 in a bearing A.

The retainer 1, together with the rolling element 3 held in the pocket P, is provided between an outer peripheral surface of an inner ring 4 and an inner peripheral surface of an outer ring 5, to constitute the bearing A.

Furthermore, in the retainer 1, a nitride layer N in a state where a nitride mainly composed of $Fe_3N$ is laminated precisely and uniformly so that the average particle diameter thereof is not more than 1 $\mu$m is formed on the entire surface of the annular plate 1a by the fabricating method as described later [see item 1) in a test as described later].

The nitride layer N may be formed in at least a portion, where the pocket P is formed, of the annular plate 1a. That is, the nitride layer N may be formed only on an inner peripheral surface of the recess 1b, or may be formed on the inner peripheral surface and other portions.

The retainer 1 is fabricated in the following manner, for example. Referring to FIG. 3, the fabricating method according to the present invention will be described.

The fabricating method comprises a forming process 11 for forming the annular plate 1a, fluoriding treatment 12 for replacing an oxide on the surface of the formed annular plate 1a with a metal fluoride film, nitriding treatment 13 for forming the nitride layer N, and an assembling process 14 for assembling the annular plates 1a into the retainer 1.

In the forming process 11, a pressed product having the shape of the annular plate 1a is formed upon being pressed by a steel plate, for example, an SPCC material.

In the fluoriding treatment 12, the pressed product which is a product to be treated is held for a predetermined time (for 10 minutes to 120 minutes) at a predetermined fluoriding temperature T1, for example, from 300° C. to 400° C. in a gaseous mixture such as of nitrogen trifluoride ($NF_3$) and nitrogen. As a result, a foreign material or the like on the surface of the pressed product is removed upon being destroyed, for example, by activated fluorine atoms used for the fluoriding treatment, whereby a passive state film such as an oxide film on the surface of steel is replaced with a metal fluoride film at the same time that the surface is purified. In this case, the metal fluoride film formed on the surface is a passive state film, whereby an adsorbing action of oxygen to the surface and an oxidizing action are prevented, to prevent an oxide from being formed until the subsequent nitriding treatment 13. As a result, the oxide can be reliably removed before the nitriding treatment.

In the nitriding treatment 13, gas nitriding is carried out. The pressed product after the fluoriding treatment which is a product to be treated (whose surface is covered with a metal fluoride film) is held for a predetermined time (for 0.5 hours to 5 hours) at a predetermined nitriding temperature T2 in predetermined reaction gas, for example, gas composed of ammonia gas ($NH_3$) alone or a gaseous mixture (for example, RX gas) of $NH_3$ and a carbon source.

The metal fluoride film on the surface of the product to be treated becomes an active film while the temperature is raised from the fluoriding temperature T1 to the nitriding temperature T2. As a result, in the nitriding treatment 13, nitrogen quickly penetrates deep into a metal, to form a nitride layer N. Thereafter, the nitride layer N is cooled in a predetermined time.

The product to be treated is held in nitrogen gas until the cooling is terminated, to prevent an oxide from being formed on the surface thereof.

It is preferable that the nitriding temperature T2 and a holding temperature in the nitriding treatment 13 are set to predetermined values depending on the depth or the like of the nitride layer N formed by the nitriding treatment 13.

If the nitriding temperature T2 is in the range of 480° C. to 700° C., a hard nitride layer can be formed on the surface. Consequently, the lubricity can be improved.

Furthermore, the surface of the product to be treated is activated by the fluoriding treatment 12, whereby the nitriding temperature T2 can be made lower than the temperature at which the product to be treated is held when the conventional nitride layer is formed. The lower the nitriding temperature T2 is, the smoother the surface of the nitride layer N tends to be made. Particularly if the nitriding temperature T2 is in the range of 480° C. to 700° C. as described above, the surface of the nitride layer N formed at the nitriding temperature T2 becomes smoother than the surface of the nitride layer of the Tufftride treated product conventionally formed.

The surface roughness of the nitride layer N takes approximately the same value as the roughness of an untreated product, that is, an abrasive finishing surface (arithmetical mean deviation Ra=0.7 $\mu$m to 1.0 $\mu$m, ten point height Rz=4.0 $\mu$m to 7.0 $\mu$m, and maximum height Rmax=4.5 $\mu$m to 7.5 $\mu$m). With respect to the surface roughness of the conventional Tufftride treated product, Ra=1.5 $\mu$m to 2.0 $\mu$m, Rz=10.0 $\mu$m to 15.0 $\mu$m, and Rmax=14.0 $\mu$m to 18.0 $\mu$m. Therefore, the surface roughness of the nitride layer N in the present invention is smaller than that of the conventional Tufftride treated product, and the smoothness thereof is significantly increased.

Furthermore, the nitride layer N has few cracks besides being smooth and precise as described above. Therefore, the holding properties of the lubricating oil on the uppermost surface of the nitride layer N are good [see item 4) in the test as described later]. Also in this respect, the seizure resistance is improved [see item 5) and item 6) in the test as described later].

Furthermore, in the nitride layer N, friction may not be increased, whereby an oil film thereon is difficult to cut. Therefore, it is possible to make the nitride layer N more difficult to seize. The coefficient of friction thereof in a non-lubricant state is 0.24, that is, not more than one-half of 0.54 which is the coefficient of friction of the conventional Tufftride treated product. As the conditions of experiments, a ball (an SUJ2 material) was reciprocated ten times upon being rolled on a specimen (an SPCC material) at a speed of 100 mm/sec and at a distance of 20 mm by applying a load of 200 gf, to measure the coefficient of dynamic friction in an HRIDON friction tester. The average value of the maximum values of respective measured values was found.

In the assembling process 14, the annular plates 1a each having the nitride layer N formed thereon are riveted by the rivets 2, and are assembled into the retainer 1.

In the retainer 1 according to the present embodiment, the following function and effect are produced.

Since the retainer 1 is formed of a steel plate, it can be used more stably, as compared with a retainer made of synthetic resin even in a high temperature environment. For example, it can be used even by a bearing used in an engine or the like.

The nitride layer N also has the advantages that it can not only improve the strength and prevent friction but also improve the lubricity, as described in detail later.

Particularly, the nitride layer N in the present embodiment is formed uniformly and precisely, whereby the surface thereof is much harder and the abrasion resistance thereof is better, as compared with the conventional nitride layer having a porous portion.

In the retainer 1, the mechanical strength of the steel plate is improved by the nitride layer N whose surface is hard, and the flexibility and the toughness thereof are maintained by an inner part, which is not nitrided, of the steel plate. Therefore, the retainer 1 has shock resistance, whereby the strength of the retainer 1 is further improved. Even if the retainer 1 gets a shock from the rolling element 3 when the bearing A comprising the retainer 1 is rotated, the retainer 1 can withstand the shock and may not be damaged. Therefore, the retainer 1 can be a retainer suitable for practical applications. Particularly, the nitride layer N formed by the fabricating method according to the present invention is lower in hardness in a central part of the material of the retainer 1 [see item 3) in the test as described later], as compared with the conventional Tufftride treated product. As a result, the flexibility and the toughness of the inner part of the retainer 1 are further improved, whereby the retainer 1 can withstand the shock. The strength of the retainer is not a mechanical strength of a material itself found by measuring a specimen in a simple shape but strength in a case where the retainer is actually used, that is, strength obtained by adding flexibility, toughness, shock resistance, and the like to the strength of the material itself.

In the present embodiment, the nitride layer N is formed precisely, uniformly, and to a sufficient thickness on the surface from which the oxide is reliably removed by the fluoriding treatment 12, whereby the lubricating oil can be held on the surface. Therefore, the oil film is not cut, so that good lubricity can be maintained. On the other hand, the nitride layer formed by the conventional Tufftride treatment is an insufficient nitride layer because it is formed on a surface on which an oxide remains, and is not sufficiently formed on the surface on which the oxide remains. Further, there exist cracks, whereby an oil film thereon may, in some cases, be cut [see item 1) and item 4) in the test as described later].

Furthermore, in the retainer 1 according to the present invention, the nitride layer itself on the surface thereof can further improve the effect of improving the lubricity by making the nitride layer N precise, uniform and sufficiently thick. Therefore, the above-mentioned effect can be kept high even in the situation where the retainer 1 is difficult to lubricate. When the retainer 1 is used for an application in which the situation where lubrication is difficult easily occurs, for example, a crank bearing with a two-cycle engine for a two-wheeled vehicle, a significant effect is produced. Meanwhile, in a case where the lubricity is improved by forming a recess as an oil sump for holding a lubricant on the surface, it is difficult to maintain the effect in the situation where lubrication is difficult.

Furthermore, in a method of fabricating the retainer according to the present embodiment, the following function and effect are produced.

Since, the nitriding treatment 13 is gas nitriding, there is no possibility of environmental pollution unlike the salt bath nitriding.

In the conventional fabricating method, metallic elements such as Cr, Mn, Si, and Al in a steel material are almost oxidized in a temperature range of from 480° C. to 700° C. in the case of nitriding treatment, so that a grain boundary oxide is formed on the surface of the steel material. The grain boundary oxide prevents the nitriding treatment, whereby preventing a nitride layer from being stably formed on the surface of the steel material. On the other hand, in the present invention, an oxide can be reliably removed by the fluoriding treatment 12, whereby a required nitride layer N can be stably formed. The hardness of the nitride layer is the same as that of the conventional Tufftride treated product, and a Vickers hardness of 450 Hv is maintained as the surface hardness [see item 2) in the test as described later].

Furthermore, since the nitriding treatment 13 is gas nitriding, reaction gas moves actively about. Therefore, nitrogen molecules uniformly prevail over the surface of a product to be treated, whereby the nitride layer N can be uniformly formed even in a complicated portion. For example, the nitride layer N is also formed on an inner peripheral surface, an edge, and the like of the recess 1b. Consequently, the abrasion resistance of the retainer is good as a whole.

Furthermore, in the case of gas nitriding, heat transfer is conventionally slow, whereby it may, in some cases, take long to sufficiently activate the surface of a product to be treated. On the other hand, in the method according to the present invention, the metal fluoride film formed on the surface of the product to be treated is sufficiently activated at the nitriding temperature T2. Therefore, nitrogen quickly penetrates into a metal, whereby it does not take long to form a sufficient nitride layer N.

Furthermore, the nitriding temperature T2 can be made lower than the temperature at which the product to be treated is held when the conventional nitride layer is formed as described above, whereby the influence of heat such as heat deformation can be reduced.

The retainer according to the present invention and a method of fabricating the same are applicable to a machined retainer, a crown pressed retainer, and the like in addition to the pressed corrugated retainer. Further, the quality of the material of the retainer is not limited to carbon steel. The present invention is also applicable to stainless steel, tool steel, chrome steel, and chrome molybdenum steel.

Although in the above-mentioned embodiment, the assembly as the retainer is carried out after the nitriding treatment of the annular plate 1a, the present invention is not limited to the same. For example, the assembling process 14 may be carried out after the forming process 11, after which the fluoriding treatment 12 and the nitriding treatment 13 may be carried out using the retainer obtained by the assembly as a product to be treated.

The nitride layer may be formed on only the inner surface of the pocket P of the bearing retainer body 1a.

Furthermore, the bearing retainer according to the present invention and the method of fabricating the same are also applicable to retainers in all shapes for various roller bearings such as a cylindrical roller bearing, a conical roller bearing, a spherical roller bearing, and a needle roller bearing in addition to the above-mentioned ball bearing.

Various design changes can be made in the range in which the gist of the present invention is not changed.

TEST

Analyses and tests concerning the following items 1) to 6) are carried out using as objects a retainer in an embodiment 1 fabricated by the above-mentioned method of fabricating the bearing retainer according to the present invention and a conventional retainer in a comparative example 1. The results will be described in the following. The retainer in the embodiment 1 is a retainer obtained by holding a pressed product of an SPCC material for thirty minutes in a gaseous mixture of $NF_3$ gas having a temperature of 350° C. and nitrogen gas and subjecting the pressed product to fluoriding treatment, then holding the pressed product for two hours in ammonia gas having a temperature of 600° C. and subjecting the pressed product to nitriding treatment. The retainer in the comparative example 1 is a retainer which is subjected to salt bath nitriding upon removing an oxide in the conventional method without fluoriding treatment.

1) Surface State

Analyzing Method

Figure 8:
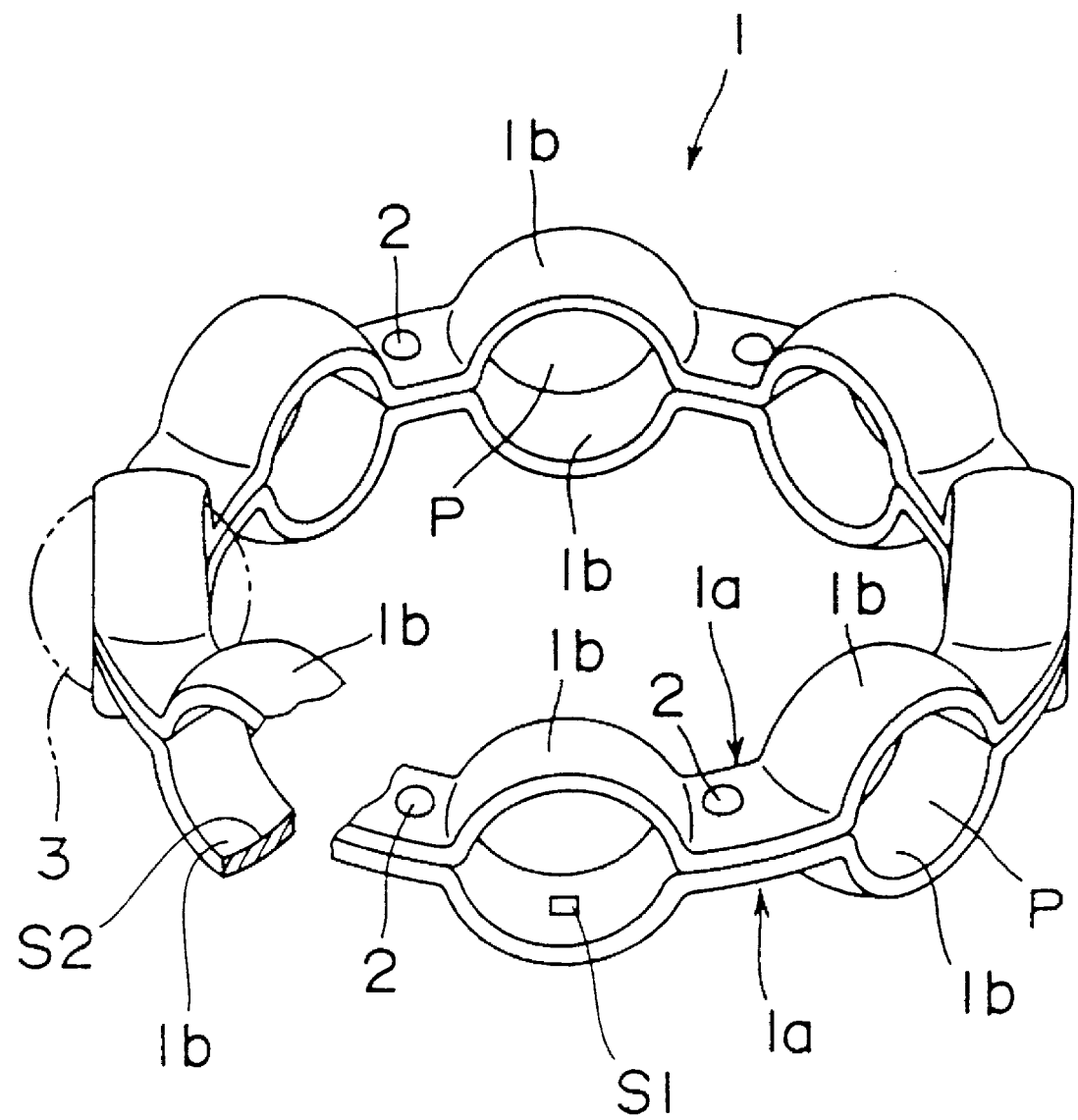
FIG. 8 is a perspective view showing a retainer for explaining a position for observation in FIGS. 4 to 7.

As shown in a perspective view of FIG. 8, with respect to the embodiment 1 and the comparative example 1, a surface S1 of a portion forming a pocket P of a retainer 1 (a portion in contact with a rolling element) and a cross section S2 in the vicinity of the surface are analyzed using a scanning electron microscope (JSM-5400 manufactured by JEOL, Ltd.).

Results

Figure 4:
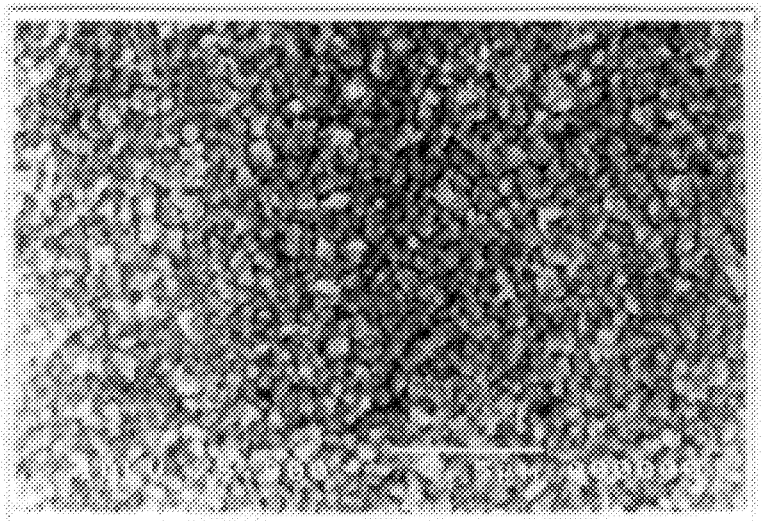
FIG. 4 is a photograph representing a metallographic structure on the surface of a nitride layer of the retainer according to the present invention.
Figure 5:
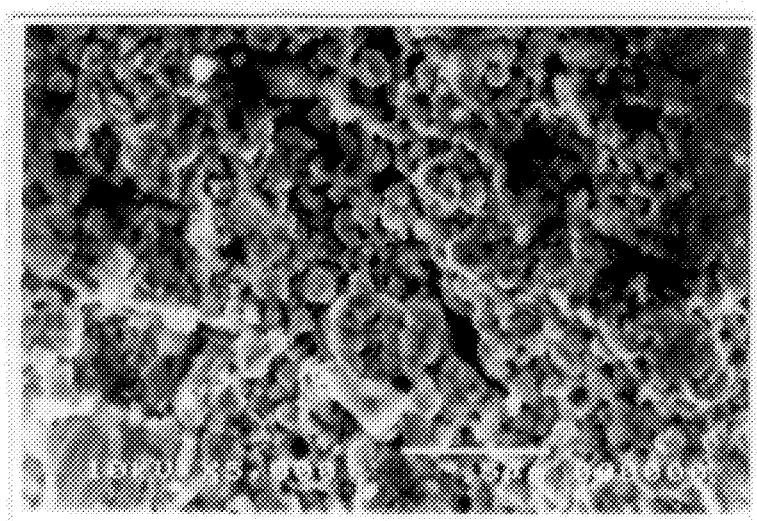
FIG. 5 is a photograph representing a metallographic structure on the surface of a nitride layer of a retainer in a comparative example 1.

An image obtained by the microscope is shown in FIGS. 4 to 7. FIG. 4 is a photograph representing a metallographic structure on the surface of a nitride layer N of the retainer 1 in the embodiment 1. FIG. 5 is a photograph representing a metallographic structure on the surface of a nitride layer of the retainer in the comparative example 1.

Figure 6:
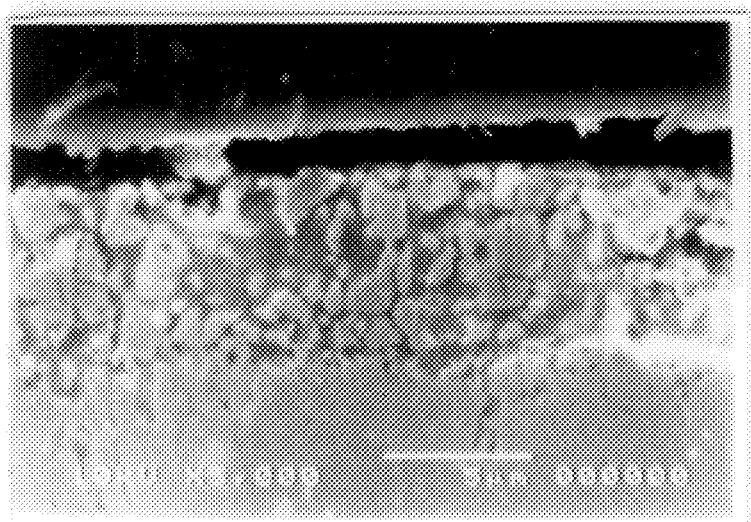
FIG. 6 is a photograph representing a metallographic structure in a cross section of the nitride layer of the retainer according to the present invention.
Figure 7:
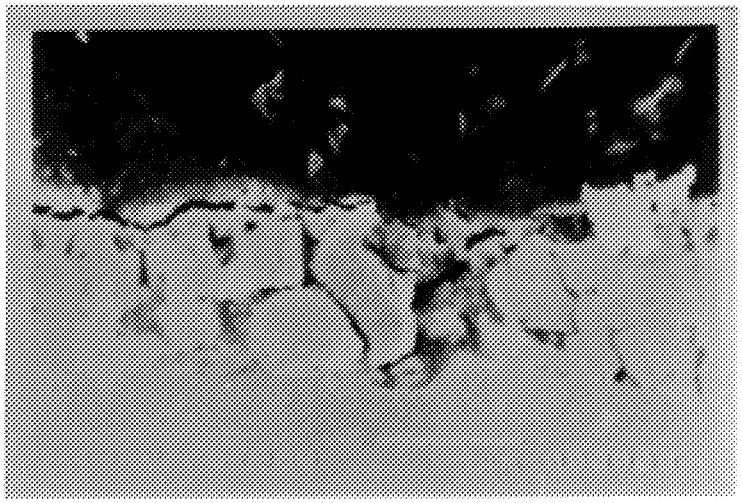
FIG. 7 is a photograph representing a metallographic structure in a cross section of the nitride layer of the retainer in the comparative example 1.

FIG. 6 is a photograph representing a metallographic structure in a cross section of the nitride layer N of the retainer 1 in the embodiment 1. FIG. 7 is a photograph representing a metallographic structure in a cross section of the nitride layer of the retainer in the comparative example 1. FIGS. 4 to 7 are photographs of an image obtained at a magnification of 5000. Scales representing sizes are depicted in the respective figures. In FIGS. 6 and 7, a white portion below the center is a retainer, and a black portion above the center is a photographic member.

Particles on the surface of the nitride layer N in the embodiment 1 are minute particles having an average particle diameter of not more than 1 $\mu$m, as shown in FIG. 4. Further, the particles are approximately uniform in size. A large rise and fall is not recognized on the surface. This is also shown in FIG. 6. It is found that the surface is made precise from the conditions in the vicinity of the surface shown in FIG. 6.

On the other hand, on the surface of the nitride layer in the comparative example 1, particles are various in size, as shown in FIG. 5. Particles having a particle diameter of approximately 5 μm are also recognized. Further, irregularity on the surface is larger than that in the embodiment 1. Further, cracks are recognized from the surface to an inner part of the nitride layer in FIG. 7.

2) Surface Hardness

When the surface hardness of the retainer in the embodiment 1 was measured in terms of Vickers hardness upon application of various test loads, the following results were obtained. A position for measurement is the surface S1 of the portion forming the pocket P of the retainer shown in FIG. 8.

Results

Average hardness in the embodiment 1: 619 Hv (a test load of 25 gf)

Average hardness in the embodiment 1: 451 Hv (a test load of 50 gf)

Average hardness in the embodiment 1: 370 Hv (a test load of 100 gf)

3) Hardness in Cross Section

The hardness of the retainer in the embodiment 1 was measured in positions in cross sections of a plurality of portions which differ in distance from the surface. Similarly, the hardness of the retainer in the comparative example 1 was also measured. A test load used in a Vickers hardness test is 100 gf.

Results

Figure 13:
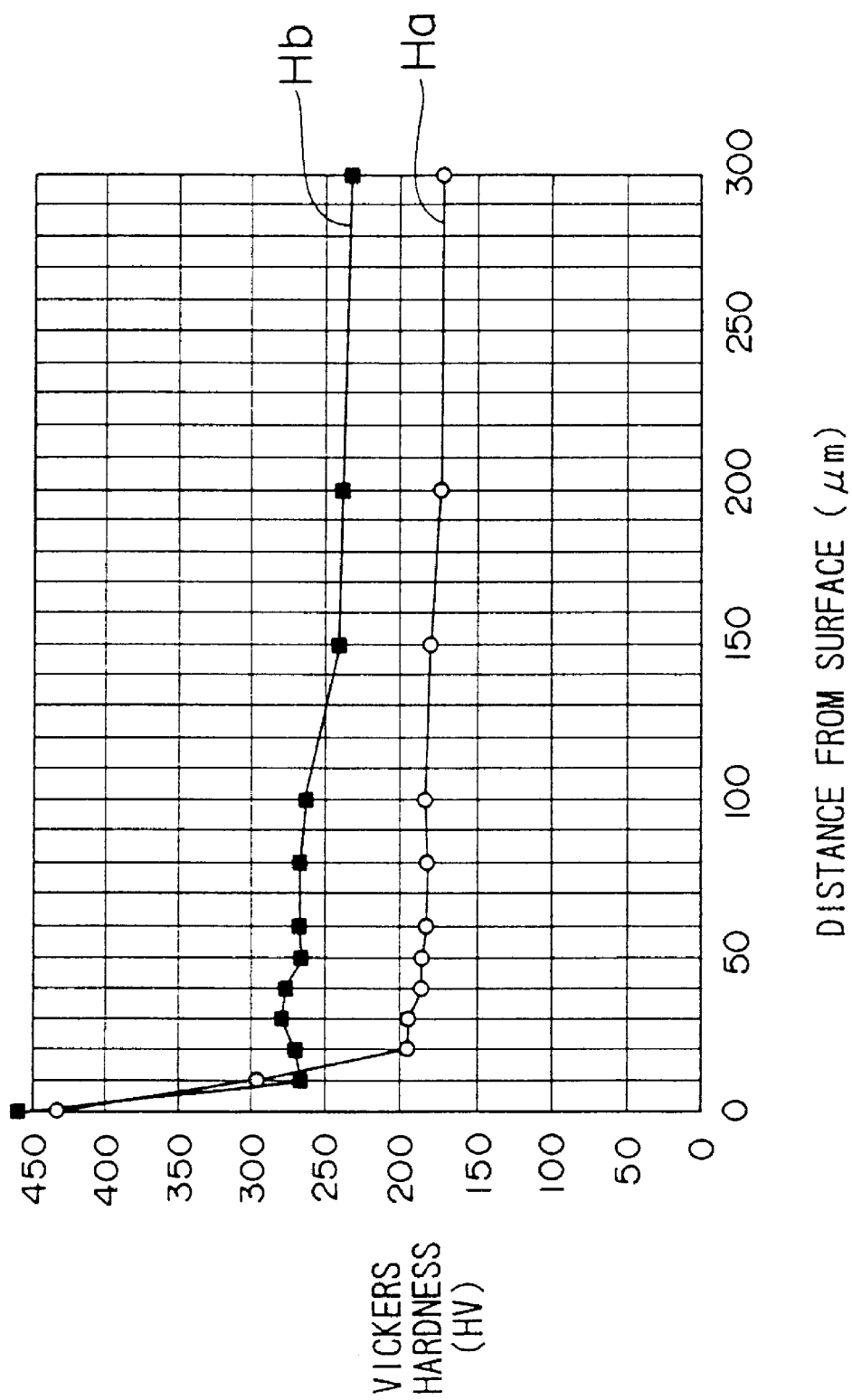
FIG. 13 is a graph showing the relationship between the hardness of the retainer in the embodiment 1 and the comparative example 1 and the distance thereof from the surface, where the Vickers hardness (Hv) is used to enter the vertical axis, the distance ($\mu$m) from the surface is used to enter the horizontal axis, a line Ha indicates a case of the embodiment 1, and a line Hb indicates a case of the comparative example 1.

FIG. 13 is a graph showing the relationship between the hardness of the retainer and the distance from the surface. In FIG. 13, a line Ha (-○-) indicates a case of the embodiment 1, and a line Hb (-■-) indicates a case of the comparative example 1. The Vickers hardness (Hv) is used to enter the vertical axis, and the distance from the surface (μm) is used to enter the horizontal axis.

The nitride layer N in the embodiment 1 has a hardness of 450 Hv in the vicinity of its surface, which is approximately the same as the nitride layer in the comparative example 1. Further, the nitride layer N in the embodiment 1 has a lower hardness than the nitride layer in the comparative example 1 in its inner part. This shows that the nitride layer N in the embodiment 1 has a two-layer hardness distribution in which the surface is hard and the inner part is soft. Moreover, this shows that the difference in hardness between the surface and the inner part in the embodiment 1 is larger than that in the comparative example 1.

Consequently, it is considered that the embodiment 1 has better shock resistance than the comparative example 1.

4) Holding Properties of Oil

Test Method

The holding properties of oil on the surface of the retainers in the embodiment 1 and the comparative example 1 were tested. That is, flat plate-shaped specimens were prepared. The same nitride layer as that formed in the embodiment 1 and the same nitride layer as that in the comparative example were respectively formed on the surfaces of the prepared specimens. 0.01 cc of lubricating oil was dropped on the surfaces of the nitride layers on the specimens. The surface before the dropping and the surface after an elapse of one hour at a temperature of 150° C. since the dropping were compared with each other by a laser electron microscope, to measure the states of films of oil on the surfaces.

Results

Figure 9:
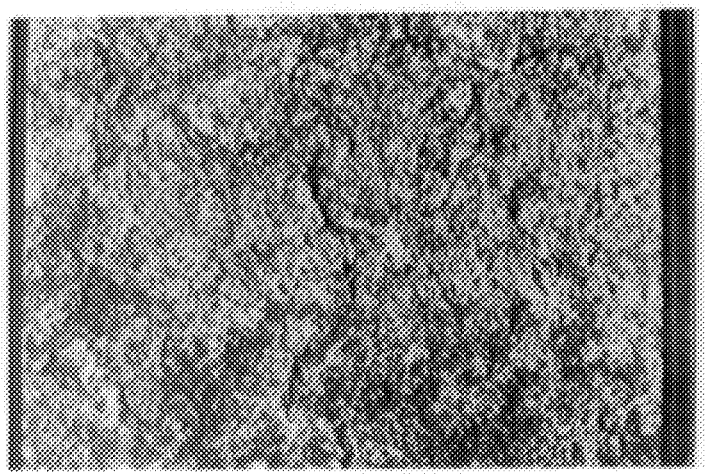
FIG. 9 is a photograph representing a metallographic structure on the surface of a nitride layer in an embodiment 1, which illustrates a state before oil dropping.
Figure 10:
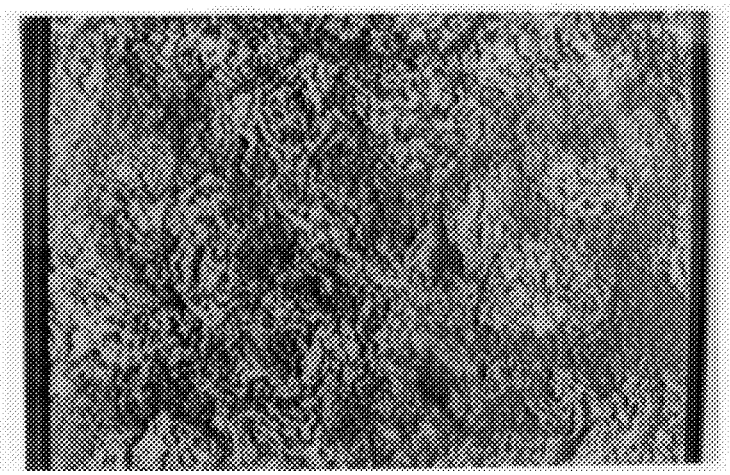
FIG. 10 is a photograph representing a metallographic structure on the surface of the nitride layer in the embodiment 1, which illustrates a state after oil dropping.
Figure 11:
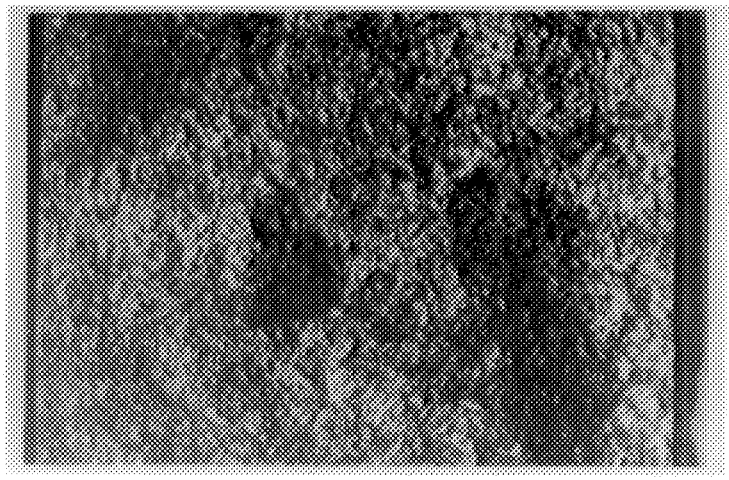
FIG. 11 is a photograph representing a metallographic structure on the surface of the nitride layer in the comparative example 1, which illustrates a state before oil dropping.
Figure 12:
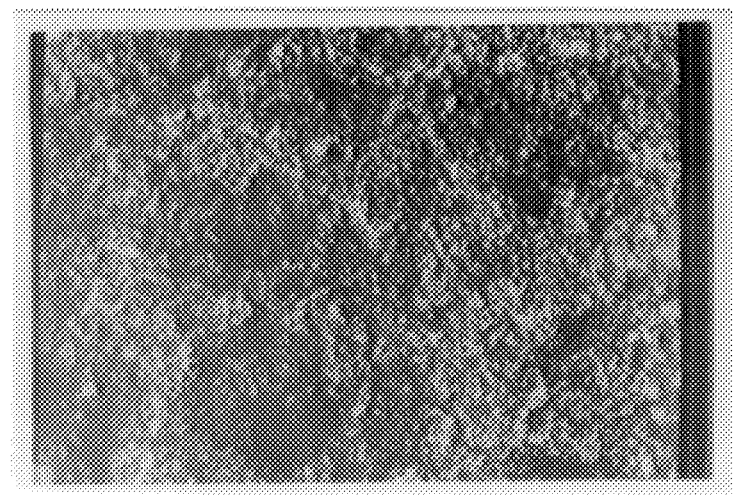
FIG. 12 is a photograph representing a metallographic structure on the surface of the nitride layer in the comparative example 1, which illustrates a state after oil dropping.

An image observed by the microscope is shown in FIGS. 9 to 12. FIG. 9 is a photograph representing a metallographic structure on the surface of the nitride layer N in the embodiment 1, which illustrates a state before the oil dropping. FIG. 10 is a photograph representing a metallographic structure on the surface of the nitride layer N in the embodiment 1, which illustrates a state after the oil dropping. FIG. 11 is a photograph representing a metallographic structure on the surface of the nitride layer N in the comparative example 1, which illustrates a state before the oil dropping. FIG. 12 is a photograph representing a metallographic structure on the surface of the nitride layer in the comparative example 1, which illustrates a state after the oil dropping. FIGS. 9 to 12 are photographs of an image obtained at a magnification of 500.

In the nitride layer N in the embodiment 1, fringe patterns representing the existence of lubricating oil are recognized throughout, as shown in FIG. 10. Therefore, it is found that the oil film is held on the surface. This will be clearer when FIG. 9 before the dropping and FIG. 10 after the dropping are compared with each other.

On the other hand, in the nitride layer in the comparative example 1, there is little difference between FIG. 11 and FIG. 12. In addition, fringe patterns are hardly recognized even in FIG. 12. Therefore, it is found that the oil film is not sufficiently held.

Consequently, it is found that the nitride layer N in the embodiment 1 is superior in the holding properties of the lubricating oil, as compared with the nitride layer in the comparative example 1.

5) Seizure Resistance (A)

Description is now made of the results of the test of seizure resistance.

The above-mentioned retainers in the embodiment 1 and the comparative example 1 were respectively applied to a bearing, to measure the life of each of the retainers under the following test conditions. The life is the time elapsed until the retainer is seized in a state where the lubrication thereof is stopped.

Test Conditions

Applied bearing: deep groove ball bearing (bearing number 6305)

Radial load: 200 Kgf

Speed of Rotation: 11000 rpm

Lubrication conditions: drop of 0.01 cc of lubricating oil for a two-cycle engine before rotation Results of Test Embodiment 1: Average Life 38.5 min.

Comparative Example 1: Average Life 18.6 min.

The retainer in the present invention thus has a life which is approximately twice as long as that of the conventional retainer even under severe conditions which are nearly non-lubricant conditions.

6) Seizure Resistance (B)

The life of each of the retainers was measured upon further imposing severer conditions on the bearing used in the above-mentioned item 5)

Test Conditions

Radial load: 400 Kgf

Speed of Rotation: 11400 rpm

Lubrication conditions: drop of 0.005 cc of lubricating oil for a two-cycle engine before rotation Results of Test Embodiment 1: Average Life 6.1 min.

Comparative Example 1: Average Life 3.9 min.

Consequently, the retainer in the present invention thus has a life which is approximately 1.6 times as long as that of the conventional retainer even under the severer conditions.

The tests in the above-mentioned items 5) and 6) are accelerated tests in which the severe conditions which are not presumed under normal usage are imposed. Consequently, the retainer in the present invention is not seized under normal usage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing retainer comprising:

a body formed of steel, and a nitride layer provided on a part of a surface of the body, the nitride layer containing nitride particles, wherein the nitride particles have an average diameter of 1 $\mu$m or less.

2. The bearing retainer according to claim 1, wherein the steel is alternatively selected from a group consisting of carbon steel, stainless steel, tool steel, chrome steel, and chrome molybdenum steel.

3. The bearing retainer according to claim 1, wherein the nitride layer comprises a layer containing a nitride compound of a component composing the steel, and a layer in which nitride atoms are diffused.

4. The bearing retainer according to claim 3, wherein the nitride compound contains chromium nitride and iron nitride.

* * * * *